M. C. HAMBLET.
HAND PROTECTION DEVICE.
APPLICATION FILED MAR. 16, 1920.

1,391,108.

Patented Sept. 20, 1921.

INVENTOR
Marcia C. Hamblet
BY
Henry C. Thomson
ATTORNEY

UNITED STATES PATENT OFFICE.

MARCIA C. HAMBLET, OF SALEM, MASSACHUSETTS.

HAND-PROTECTION DEVICE.

1,391,108. Specification of Letters Patent. Patented Sept. 20, 1921.

Application filed March 16, 1920. Serial No. 366,371.

*To all whom it may concern:*

Be it known that I, MARCIA C. HAMBLET, a citizen of the United States of America, residing at Salem, in the county of Essex and State of Massachusetts, have invented new and useful Improvements in Hand-Protection Devices, of which the following is a specification.

This invention relates to a hand-protection device, and more particularly, to a device adapted to be applied to an implement handle, steering wheel of an automobile or the like, for the purpose of preventing soiling and soreness of the hands.

An object of the invention is to provide a protection device formed from suitable material, which is secured in position in such manner that the securing means are entirely inclosed.

Another object of the invention is to provide a device of the above description, which is neat in appearance, inexpensive to manufacture, and which can be readily attached or removed as the occasion may require.

Figure 1:
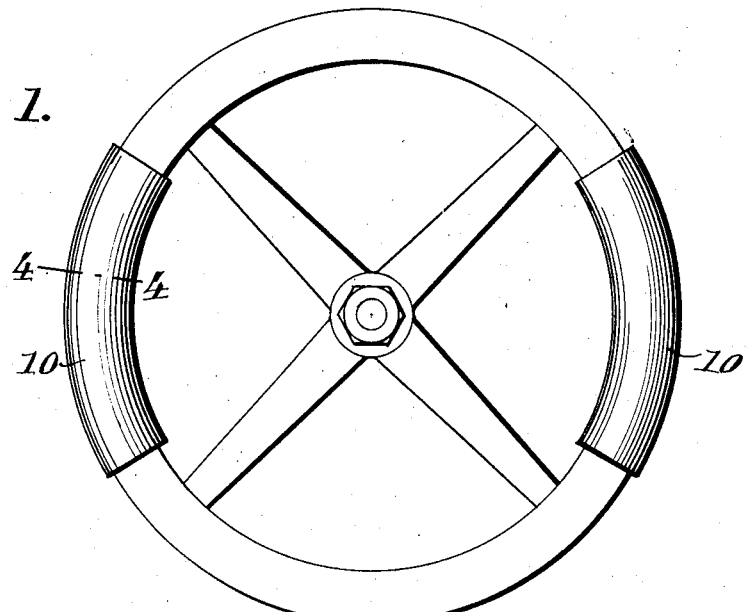
Figure 2:
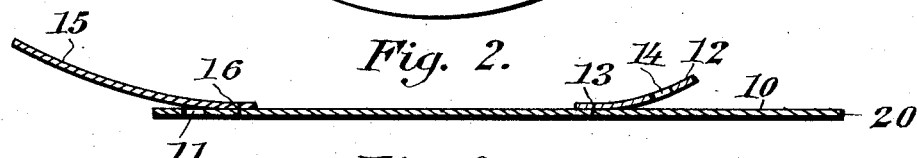
Figure 3:
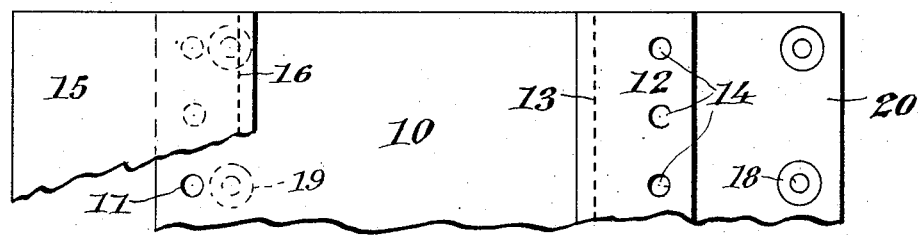
Figure 4:
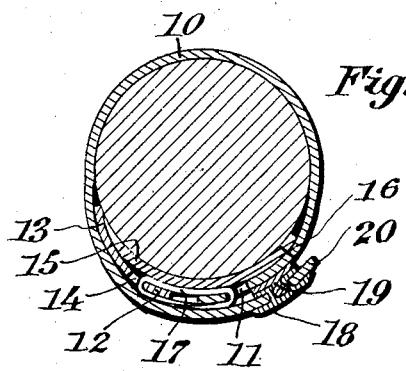

In the accompanying drawings wherein is shown the preferred embodiment of the invention, Figure 1, is a plan view of an automobile steering wheel illustrating the application of the invention thereto;

Figs. 2, and 3, are respectively a section and a plan view of a portion of the device before it is applied; and Fig. 4, is a section taken on the line 4—4, of Fig. 1.

In order to prevent accumulated dirt on implement handles, steering wheels of automobiles, or the like, from soiling the gloves or hands, I propose to apply to such handle or steering wheel one or more protecting devices, which, in the present instance, comprise suitable rectangular pieces of fabric or leather, 10, which are adapted to be wrapped around and securely fastened to such handle or steering wheel. While my attachment is designed for use on handles, automobile steering wheels, or the like, I have, in this case, chosen to show its application to an automobile steering wheel, a conventional form being illustrated by Fig. 1, of the drawings.

Any desirable means of securing the member, 10, to a wheel may be utilized, but in the form of device herein shown and described, I prefer to lace the section, 10, to the wheel after it has been wrapped thereround, and for this purpose, along one edge of the material I provide a series of perforations, 11, which are spaced approximately equal distances apart, and may be of any number. At a suitable distance across the breadth of the material from the perforations, 11, and also some distance from the opposite edge thereof, I attach a flap or strip, 12, by stitches, 13, or other suitable means; the strip, 12, having a series of perforations, 14, which are spaced the same distance apart as the perforations, 11. Another flap or strip, 15, is stitched (16) to the edge of the material, 10, having the perforations, 11, and this flap overlies the perforations and extends beyond the edge of the material, so that when the device is wrapped around a steering wheel or handle, as shown by Fig. 4, of the drawings, the flap, 15, will be against the wheel, while the flap, 12, and the perforated portion, 11, of the material, 10, will overlie it.

The position of the flap, 12, with respect to the series of perforations, 11, of the material, 10, is such that as the material is wrapped around a steering wheel, the edge having the perforations, 11, and the flap having the perforations, 14, will be slightly spaced apart, and by means of a suitable lace, 17, they can be drawn toward each other in a manner similar to that employed in lacing shoes, or the like. As the flap, 15, is interposed between the laces, 17, and the wheel, it will serve the purpose of preventing the laces, 17, from marring the wheel, as will be readily understood.

The free end of the material, 10, that extends beyond the flap, 12, has secured thereto a series of female portions, 18, and adjacent the perforations, 11, but on the face of the material opposite the flap, 15, are secured a similar number of male portions, 19, of snap fasteners, so that after the flap, 12, and the opposite edge of the material have been laced together, the free edge of the material may be snapped to the body thereof, as shown in Fig. 4, thus inclosing the lacings.

From the foregoing description, taken in connection with the drawings, it will be noted that I have provided a device which can be readily and quickly applied to an automobile steering wheel, or, in fact, to any other article so desired. I prefer that the body of my device be formed of some such material that can be readily laundried, and that will be soft and pliable after laundrying. In actual practice, I have found chamois skin to be the best material for this purpose, but I do not care to be limited thereto, as any other material found desirable can be utilized.

Having thus described my invention, what I claim and desire to secure by Letters Patent is:

1. A device of the class described, comprising a body portion adapted to encircle a handle, perforations adjacent one of the edges of the body portion, a perforated flap secured to the body portion at a distance from the opposite edge thereof, said perforated flap being adapted to be brought toward the perforated edge of the body portion and secured thereto by means of laces, and a flap interposed between the lacing and the handle.

2. A device of the class described, comprising a body portion adapted to encircle a handle, perforations adjacent one of the edges of the body portion, a perforated flap secured to the body portion at a distance from the opposite edge thereof, a free edge extending beyond said flap, said perforated flap being adapted to be brought toward the perforated edge of the body portion and secured thereto by means of laces, a flap interposed between the lacing and the handle, and means for securing the free edge to the body portion.

3. A device of the class described, comprising a body portion adapted to encircle a handle, perforations adjacent one of the edges of the body portion, a flap overlying the perforations and positioned adjacent the handle, a perforated flap secured to the body portion at a distance from the opposite edge thereof, and adapted to underly the first flap, said perforated flap being adapted to be brought toward the perforated edge of the body portion and secured thereto by means of laces, and means for securing the free edge of the body portion beyond the perforated flap to the body portion after the perforated portions have been laced together.

In testimony whereof I affix my signature in presence of two witnesses.

MARCIA C. HAMBLET.

Witnesses:
HENRY C. THOMSON,
LILLIAN K. BALEY.